(12) United States Patent
Reeb et al.

(10) Patent No.: US 11,161,206 B2
(45) Date of Patent: Nov. 2, 2021

(54) METHOD AND DEVICE FOR THE IMPACT TREATMENT OF TRANSITION RADII OF A CRANKSHAFT

(71) Applicant: MASCHINENFABRIK ALFING KESSLER GMBH, Aalen (DE)

(72) Inventors: Alfons Reeb, Aalen (DE); Jochen Schmidt, Boebingen a.d. Rems (DE); Konrad Grimm, Aalen (DE)

(73) Assignee: MASCHINENFABRIK ALFING KESSLER GMBH

( * ) Notice: Subject to any disclaimer, the term of this patent is extended or adjusted under 35 U.S.C. 154(b) by 45 days.

(21) Appl. No.: 16/622,747

(22) PCT Filed: May 24, 2018

(86) PCT No.: PCT/EP2018/063689
§ 371 (c)(1),
(2) Date: Dec. 13, 2019

(87) PCT Pub. No.: WO2018/228790
PCT Pub. Date: Dec. 20, 2018

(65) Prior Publication Data
US 2020/0101569 A1    Apr. 2, 2020

(30) Foreign Application Priority Data
Jun. 14, 2017 (DE) .......................... 102017113065.9

(51) Int. Cl.
*B23P 9/04* (2006.01)

(52) U.S. Cl.
CPC ............. *B23P 9/04* (2013.01); *B23P 2700/07* (2013.01)

(58) Field of Classification Search
CPC .......... B23P 9/04; B23P 2700/07; C21D 9/30; C21D 7/04; B21H 7/185; B24B 39/04
See application file for complete search history.

(56) References Cited

U.S. PATENT DOCUMENTS 4,171,654 A * 10/1979 Kreucher ................ B23B 5/18
409/189
4,416,130 A    11/1983 Judge, Jr.
(Continued)

FOREIGN PATENT DOCUMENTS

DE    3438742 A1    4/1986
DE    3438742 C2    3/1988
(Continued)

OTHER PUBLICATIONS

English translation of DE102005032185 (Year: 2007).*

*Primary Examiner* — Jun S Yoo
(74) *Attorney, Agent, or Firm* — Burr & Forman LLP; Harvey S. Kauget

(57) ABSTRACT

The invention relates to a method for the impact treatment of transition radii (8) of a crankshaft (4, 4'), in particular transition radii (8) between connecting rod bearing journals (5, 5') and crank webs (7, 7') and/or transition radii (8) between main bearing journals (6, 6') and the crank webs (7, 7') of the crankshaft (4, 4'). The crankshaft (4, 4') is then rotated along a rotational direction into an impact position by means of a drive device (3, 3'). A locking device (12) is provided in order to lock the crankshaft (4, 4') in the impact position, and an impact force is then introduced into at least one transition radius (8) by at least one impact tool (16, 16').

12 Claims, 3 Drawing Sheets

(56) References Cited

U.S. PATENT DOCUMENTS

| | | | |
|---|---|---|---|
| 4,682,489 A | 7/1987 | Bauerle et al. | |
| 6,160,248 A | 12/2000 | Ottenwaelder et al. | |
| 6,408,663 B1 | 6/2002 | Pickren | |
| 8,011,096 B2 | 9/2011 | Reeb et al. | |
| 9,015,939 B2 | 4/2015 | Reeb et al. | |
| 2007/0169532 A1* | 7/2007 | Reeb ................... | B24B 39/045 72/460 |

FOREIGN PATENT DOCUMENTS

| | | |
|---|---|---|
| DE | 102006058710 | 6/2008 |
| DE | 102007028888 | 1/2009 |
| EP | 0788419 | 8/1997 |
| EP | 1034314 | 9/2000 |
| EP | 1479480 | 11/2004 |
| EP | 1612290 | 1/2006 |
| EP | 1716260 | 11/2006 |
| EP | 3141331 | 3/2017 |

\* cited by examiner

METHOD AND DEVICE FOR THE IMPACT TREATMENT OF TRANSITION RADII OF A CRANKSHAFT

BACKGROUND OF THE INVENTION

The invention relates to a method for the impact hardening of transition radii of a crankshaft, in particular of transition radii between connecting-rod bearing journals and crank webs and/or transition radii between main bearing journals and the crank webs of the crankshaft, as per the preamble of claim 1.

The invention also relates to an apparatus for the impact hardening of transition radii of a crankshaft.

The invention also relates to a computer program with program code means.

Owing to the continuously progressing development and increasing performance of internal combustion engines and stringent emissions requirements placed on these, modern engines are consequently subjected to ever greater loading. For this reason, the motor industry places high demands with regard to strength inter alia on the crankshaft, which is subjected to high loading and which is important for the function of an internal combustion engine. Here, in terms of construction, there is often the demand for the crankshaft to be of low weight and for the space requirement to be small. For the design of the crankshaft, this means that an increase in the load capacity should be achieved not by increasing the cross section, that is to say by means of the section modulus of the crankshaft, but as far as possible by means of local internal compressive stress states. For this reason, modern crankshafts are produced using a wide variety of machining and heat treatment methods, such that the crankshafts can be subjected to increasingly higher levels of engine power.

Examples of such methods are thermal treatments, such as the surface hardening methods of induction and case hardening, laser hardening or nitriding, and strain hardening methods, such as deep rolling, shot peening or impact hardening. These are common and for the most part well-established methods, which are suitable for a wide variety of purposes.

With regard to examples of such methods, reference is made to the following documents: EP 1 479 480 A1, EP 0 788 419 B1, EP 1 612 290 A1, DE 10 2007 028 888 A1 and EP 1 034 314 B1.

Impact hardening in particular is an advantageous method for increasing the fatigue strength, in particular the bending fatigue strength and the torsional fatigue strength, of crankshafts. The increase in the fatigue strength is achieved here by virtue of impact forces being introduced into the crankshaft by cold working, preferably hammering by means of special impact tools, in the loaded regions at transitions in cross section and changes in cross section. As examples for such a process, reference is made to DE 34 38 742 C2 and EP 1 716 260 B1.

In order to prevent a disadvantageous introduction of shear stresses during the local hammering, it is proposed in DE 34 38 742 C2 that, at the time of the pressure pulse action, no relative movement be allowed to occur between the pulse-imparting body and the tool surface transversely with respect to the pulse direction. For this purpose, the feed motion during the introduction of internal compressive stresses by means of the impact tools should be performed in stepped fashion.

As a further development of this method, it has been proposed in EP 1 716 260 B1 for the crankshaft to be rotated continuously during the machining process, wherein, during the introduction of internal compressive stresses by means of the impacting of the impact tool against the crankshaft segment to be machined, the rotational movement of the crankshaft is stopped during the time in which the impact tool acts on the crankshaft. Here, the impact pressures are selected such that the rotational movement of the crankshaft is forcibly stopped by the impact movement.

For this purpose, however, complex components such as for example transmissions, clutches and/or spring systems are required within the drive device in order to prevent the drive device from being damaged by the "forced stops". Furthermore, the timing of the crankshaft and the introduction of the internal compressive stresses must be synchronized in a reliable manner in terms of a process. Here, the mechanical components required to ensure a robust installation are complex and expensive.

The present invention is based on the object of providing a cost-effective and reliable method and an apparatus for increasing the fatigue strength of crankshafts.

Said object is achieved, for the method, by means of the features specified in claim 1.

Finally, the invention is also based on the object of providing a computer program with program code means for carrying out an improved method for increasing the fatigue strength of crankshafts.

SUMMARY OF THE INVENTION

The dependent claims and the features described below relate to advantageous embodiments and variants of the invention.

In the method according to the invention for impact hardening, provision is made whereby transition radii of a crankshaft, in particular transition radii between connecting-rod bearing journals and crank webs and/or transition radii between main bearing journals and the crank webs of the crankshaft, are impact-hardened. In this case, the crankshaft is firstly rotated by means of a drive device along a direction of rotation into an impact position.

The connecting-rod bearing journals and the main bearing journals will hereinafter in some cases also be referred to merely as "journals" for simplicity. Here, the expression "journals" may refer both to the connecting-rod bearing journals and to the main bearing journals, and also only to the connecting-rod bearing journals or only to the main bearing journals. Unless explicitly stated otherwise, all three variants are encompassed by the expression "journals" here.

The invention is particularly preferably suitable for increasing the fatigue strength of, for example, crankshafts with a length of 0.2 to 8 m or more and/or main and connecting-rod bearing journal diameters of 30 to 500 mm or more. The invention is however very particularly preferably suitable for increasing the fatigue strength of large crankshafts with a length of 1.5 to 8 m or more and/or main and connecting-rod bearing journal diameters of 100 to 500 mm or more.

The crankshaft may have various types of transition radii, for example fillets, for example in a basket arch shape, or also undercut radii or radii with transitions. The transition radii may for example transition tangentially into the bearing journal points or running surfaces of the main and connecting-rod bearing journals.

This also applies for transitions to flanges, journals and other geometrical changes in cross section—both for tangential and undercut radii.

The crankshaft commonly has transition radii at all transitions or changes in cross section. This applies in particular to changes in cross section between bearing journals and crank webs. The invention is particularly suitable for these. Transition radii may however also be provided for any other changes in cross section, in particular for changes in cross section at the end sections of the crankshaft, in particular at a transition to a flange, a disk or a shaft etc. A transition radius whose fatigue strength is to be improved by means of the method according to the invention and/or the apparatus according to the invention thus need not imperatively be present between a connecting-rod bearing journal and a crank web or a main bearing journal and a crank web, but may rather be arranged at any location of the crankshaft. The expressions "connecting-rod bearing journal", "main bearing journal", "flange", "journal" and/or "crank web" may be reinterpreted accordingly by a person skilled in the art.

The invention will be described below substantially on the basis of the hardening of transition radii between connecting-rod bearing journals and crank webs and/or main bearing journals and crank webs. This is however not to be understood as limiting, and is intended to serve merely for improved understanding or improved readability. Where reference is made to a transition radius in the context of the invention, this may basically be any transition radius at any location of the crankshaft.

According to the invention, an arresting device is provided in order to arrest the crankshaft in the impact position, following which an impact force is introduced into at least one transition radius by means of at least one impact tool.

The introduction of an impact force can be understood to mean that an impact head of an impact tool, or a so-called "header" of an impact device, impacts against that region of the crankshaft which is to be hardened, in the present case a transition radius. Here, the impact is performed in targeted fashion at the desired impact position along the transition radius running in annularly encircling fashion around the journal. Normally, an impact piston is used which transmits an intense pulse or an impulse (generated for example pneumatically, hydraulically and/or electrically) to the impact head.

Depending on the impact force, visible impact impressions of the impact head are formed at the respective impact positions. The depth of the impact impressions and the quality or the depth effect of the introduced internal compressive stresses are in this case dependent on the selected impact force. The tool and the process parameters are preferably exactly coordinated with the respective crankshaft and, here, if appropriate, with partial geometrical changes (changes in cross section).

In the method according to the invention, (parasitic) shear stresses are substantially, if not even entirely, prevented.

By virtue of the fact that the rotational movement of the crankshaft is stopped in the impact position not by the impact tool itself but by the drive device, the demands on the mechanical components of the drive device, and possibly even the service life of the drive device, are improved. By means of the arresting device, it is furthermore possible for the impact force to be introduced in a particularly targeted manner into the desired region. This is possible because the crankshaft cannot rotate along or counter to the rotational direction in an undesired manner upon the impacting of the impact tool.

Through the method according to the invention, it is thus possible to ensure highly precise working or impact hardening. The impact spacings can be implemented in a very particularly targeted manner and with small tolerances.

An arresting device may be a device which arrests the crankshaft in preferably non-positively locking and/or positively locking fashion, or engages with this aim into the drive train or into the apparatus. A non-positively locking arresting means is preferably provided, wherein the arresting force is selected such that a rotation of the crankshaft during the introduction of the impact force is prevented or at least suppressed.

The arresting device may be a hydraulically, pneumatically and/or electrically operated arresting device.

The arresting device preferably has one or more brake shoes, for example two brake shoes, three brake shoes, four brake shoes or more brake shoes.

The arresting device is preferably attached to the workpiece drive unit. For example, the arresting device may be arranged on a jaw chuck or a clamping flange, a fastening flange or a face plate of the workpiece drive device, or directly on the motor or the drive.

The method according to the invention and the apparatus according to the invention may also be applied or used in the case of crankshafts which have already been machined beforehand using other methods in order to increase the fatigue strength characteristics thereof. For example, a crankshaft that has been hardened by induction hardening can retroactively also be improved with regard to its bending and torsional fatigue strength by means of an introduction of internal compressive stresses in accordance with the method according to the invention.

In one refinement of the invention, provision may be made whereby a closed-loop position controller is used for the operation of the drive device in order to rotate the crankshaft into the impact position, wherein the crankshaft is rotated preferably in stepped or clocked fashion.

With a closed-loop position controller, a point-to-point movement of the crankshaft can thus be achieved. For example, an open-loop position controller may be used in order to rotate the crankshaft in stepped or clocked fashion from one impact position to the next impact position. In the simplest case, an open-loop PTP controller or point controller may be provided for this purpose.

The drive device may comprise a motor, in particular an electric motor. The electric motor may basically be any electric motor, for example a three-phase motor (in particular a three-phase asynchronous machine), an AC motor, a DC motor or a universal motor.

A stepper motor may preferably be used.

It is also possible for a two-part drive device to be provided, in the case of which, for example, a motor is provided at each end of the crankshaft, that is to say a synchronous drive or bilateral drive of the crankshaft.

In one refinement of the invention, provision may be made whereby the controller of the drive device and the controller of the arresting device are synchronized with one another such that the arresting device arrests the crankshaft only when the crankshaft is at a standstill in the impact position.

The arresting device may basically also, in the case of a corresponding design, for example in the case of a design based on non-positive locking, be used for braking the rotational movement of the crankshaft. It is however particularly preferable to use the arresting device only for arresting the crankshaft in the impact position, whereby the dynamics or rotation of the crankshaft is influenced only by the drive device. That is to say, a torque that leads to an acceleration of the crankshaft (or to braking) should preferably be introduced exclusively by the drive device. For example, the controller of the drive device (for example a closed-loop position controller) and/or the controller of the arresting apparatus can be of particularly simple construction. It may thus suffice to merely synchronize the points in time at which the drive device and arresting device act on the crankshaft through corresponding time management. The drive device and the arresting device thus preferably do not act on the crankshaft simultaneously.

In one refinement of the invention, provision may furthermore be made whereby the controller of the arresting device and the controller of the at least one impact tool are synchronized with one another such that the at least one impact tool introduces the impact force into the at least one transition radius of the crankshaft only when the crankshaft has been arrested in the impact position.

Undesired shear stresses can be prevented entirely in this way.

It is however basically also possible for the introduction of the impact force to begin already when the crankshaft has not yet been fully arrested in the impact position.

The synchronization of the controllers of the drive device, arresting device and/or of the at least one impact tool may also be performed such that the points in time or time ranges in which the individual components act on the crankshaft at least partially overlap. Faster timing of the entire method can be achieved in this way.

In one refinement of the invention, provision may be made whereby the drive device is designed as a direct drive.

A drive device without a clutch is preferably provided.

In the present case, a direct drive is to be understood to mean drives in the case of which the motor, preferably an electric motor, and the driving shaft are connected or coupled directly or without a transmission ratio. In particular, a transmission is omitted.

When using the method according to the invention, it is also preferably possible to omit a clutch, in particular a slipping clutch. A slipping clutch, used inter alia for protecting components, is provided for example in the method according to EP 1 716 260 B1 in order that the drive device or the apparatus is not damaged upon the forced stop of the crankshaft as a result of the impacting of the impact head. Such damage is ruled out in the case of the method described here, whereby the slipping clutch can be rendered unnecessary.

In this way, the construction of the drive device is very particularly simple and thus economical.

In one refinement of the invention, provision may be made in particular whereby the arresting device and the drive device are arranged separately from one another.

The arresting device is preferably not designed as a brake arrangement within the drive device, which may be required for example for the closed-loop position control. Normally, in a drive device that comprises an electric motor and performs point-to-point operation by means of a closed-loop position controller, no brake arrangement is provided in any case, because the torques are generated through closed-loop voltage and/or current control of the electric motor. Should the drive device however comprise a conventional brake device, provision may possibly be made whereby the arresting device according to the invention is provided in addition to this and is designed as an assembly independent thereof.

The arresting device may basically also be arranged separately within the drive device. In this case, too, these are preferably mutually independent components which are spatially separate and/or functionally independent.

In an alternative embodiment, which is not preferred, a brake device of the drive device may be used. For this purpose, said brake device must be suitably designed in order that the crankshaft does not rotate during the introduction of the impact force.

In one refinement of the invention, provision may furthermore be made whereby the arresting device arrests the crankshaft indirectly by virtue of the arresting device arresting a rotatable fastening device, preferably a fastening flange or a clamping flange of the fastening device, to which flange or fastening device the crankshaft is fixed.

Instead of the fastening flange or in addition to the fastening flange, the fastening device may also comprise a face plate or some other clamping means.

In particular, a face plate with multiple clamping jaws, for example two, three, four, five, six or more clamping jaws, may be provided. In this way, crankshaft types with different diameters can be fixed.

The crankshaft is, for the processing thereof, commonly rotatably fixed by means of a fastening device to a drive shaft.

In order to arrest the crankshaft in its impact position, the arresting device may basically engage at any desired position that is mechanically coupled to the drive device or to the crankshaft. For example, the arresting device may engage on the crankshaft itself, may engage within the drive device for example on the drive shaft, may engage outside the drive device for example on the drive shaft, or may particularly preferably engage on the fastening device, in particular on a fastening flange or on a face plate or some other clamping means.

In one refinement, provision may be made in particular whereby the arresting device engages on the fastening device or on the fastening flange or on the face plate or on the clamping flange in the region of an outer circumference.

By virtue of the fact that the arresting device engages in the region of an outer circumference of a plate or shaft, the arresting forces which must be imparted, or which are required, can be lower. Depending on the radial position of the arresting device in relation to the axis of rotation of the drive shaft, correspondingly less force is required to block a torsional moment the greater the radial spacing to the axis of rotation is. It is particularly advantageous here if the arresting device engages only when the crankshaft is already at a standstill in the impact position.

The arresting device may basically also engage on multiple locations within the apparatus. For example, provision may be made whereby the arresting device engages on in each case one suitable location in the region of both ends of the crankshaft, for example on fastening flanges situated there.

A support in the manner of a tailstock may also be provided in order to rotatably support or fix the crankshaft at its end averted from the drive device.

The arresting device may then for example engage in the region of the drive device or drive shaft and/or in the region of the support. It is preferable in this case, too, for the arresting device to engage on the fastening device, preferably a fastening flange, as described.

In one refinement of the invention, provision may be made whereby the arresting device is designed to prevent rotation of the crankshaft counter to and/or in the direction of rotation of the crankshaft.

In one refinement, provision may also be made whereby the impact hardening is performed such that the impact impressions of an impact head of the impact tool overlap in a defined manner along the respective transition radius running in annularly encircling fashion around the connecting-rod bearing journals or main bearing journals.

In particular if the impact impressions of an impact head along the respective transition radius running in annularly encircling fashion around the journal are intended to overlap, that is to say if the impact positions are closely spaced apart, then it is necessary for the impact force to be introduced in a highly precise and targeted manner. Without the arresting device according to the invention, this is difficult because, during the introduction of the impact force, the crankshaft would at least partially rotate back from one impact position into the previous impact position if the impact head penetrates into the impact impression of the previous impact. Since it has been found that a particularly effective increase in fatigue strength or flexural fatigue strength and torsional fatigue strength can be generated by means of overlapping impact impressions or closely arranged and exactly defined impact positions, the invention is particularly advantageous in combination with the introduction of closely positioned and/or precise impact spacings, in particular such that the impact impressions overlap or intersect.

In one refinement of the invention, the at least one impact tool can perform an impact movement, or introduce the impact force, with a periodicity, preferably with a timing or impact frequency of 0.5 Hz to 30 Hz, particularly preferably with a timing of 0.5 Hz to 5 Hz and very particularly preferably with a timing of 0.5 Hz to 3 Hz.

Other timings, for example also impact frequencies between 0.1 Hz and 50 Hz, may self-evidently also be provided, but the values stated above are very particularly suitable.

The impact pressures that can be implemented by the impact piston to generate the impact force may—depending on the operating mode—amount to between 10 and 300 bar, preferably between 30 and 180 bar, and particularly preferably between 50 and 130 bar.

The temperature in the region of the crankshaft segment or transition radius to be machined should preferably be no higher than 65° C.; values between 12° C. and 25° C. are preferred.

It has been found from experience that micro-cracks, which are not capable of propagating, can form in the surface of crankshafts after dynamic loading in the engine or on the test stand. These micro-cracks have no effect on the fatigue strength characteristics but they can impair the visual appearance.

Since the introduction of internal compressive stresses can be performed preferably to a depth of 15 mm or else even deeper, this means that a removal of a few millimeters, for example of 0.1 to 3 mm, preferably 0.5 mm, can be performed in the surface region of the crankshaft without the flexural and torsional fatigue strength, or the fatigue strength, of the crankshaft being adversely affected.

Tests have shown that such measures can even slightly increase the fatigue strength, for example by up to 5%.

The removal of the surface may be performed in various ways, for example by grinding, turning, milling, rotary milling, peeling or polishing.

The invention also relates to an apparatus for the impact hardening of transition radii of a crankshaft, in particular of transition radii between connecting-rod bearing journals and crank web and/or transition radii between main bearing journals and the crank webs of the crankshaft, having a drive device for rotating the crankshaft into an impact position. According to the invention, an arresting device is provided in order to arrest the crankshaft in the impact position, wherein, furthermore, at least one impact tool is provided in order to introduce an impact force into at least one transition radius in the impact position.

The apparatus is also suitable for the impact hardening of transitions to flanges, journals and other geometrical changes in cross section both for tangential and undercut radii.

Features that have already been described in conjunction with the method according to the invention are self-evidently also advantageously implementable for the apparatus according to the invention, and vice versa. Furthermore, advantages that have already been mentioned in conjunction with the method according to the invention can also be understood as relating to the apparatus according to the invention, and vice versa.

Provision may be made whereby two impact tools are used in a common impact device, which impact tools introduce impact forces simultaneously into both transition radii of a connecting-rod bearing journal or of a main bearing journal. The impact tools may be coupled by means of a deflecting unit and thus preferably operated by a common impact piston.

It is also possible to provide multiple impact tools which can be used independently of one another (for example through the use of multiple impact devices with in each case one or more impact tools), which are capable of introducing a respective impact force into any transition radii of the crankshaft, wherein a corresponding synchronization with one another or between the controllers of the drive device and/or arresting device and/or further impact tools may be provided.

Provision may also be made for only one impact tool to be used.

In particular in the case of multiple impact tools being used, a common pressure pulse device may be provided which is capable of generating the corresponding impact forces for the impact tools by hydraulic, pneumatic, mechanical and/or electrical means (jointly or individually) for the impact tools.

In one refinement of the invention, provision may be made whereby the drive device and the arresting device are formed and arranged separately from one another.

In one refinement, it is furthermore possible for a rotatable fastening device to be provided in order to fix the crankshaft, wherein the arresting device is arranged and designed to arrest the fastening device for the crankshaft.

In one refinement of the invention, provision may furthermore be made whereby the fastening device has a fastening flange which is arrestable by means of the arresting device, preferably by virtue of the arresting device engaging on the fastening flange in the region of an outer circumference.

In one refinement, provision may also be made whereby the drive device is arranged and designed to rotate the fastening device, preferably to rotate said fastening device about an input shaft of the fastening device. The input shaft of the fastening device may be an output shaft of the drive device, for example of an electric motor.

The fastening device may preferably be arranged between an output shaft of the drive device and the crankshaft.

In one refinement of the invention, an open-loop and/or closed-loop control device, preferably comprising a microprocessor, may be provided in order to realize and/or synchronize the rotational movement of the drive device and/or the controller of the arresting device and/or the controller of the at least one impact tool.

An open-loop and/or closed-loop control device may be provided which comprises the controllers of the arresting device, of the drive device and/or of the at least one impact tool.

Instead of a microprocessor, provision may also be made of any other device for implementing an open-loop and/or closed-loop control device, for example one or more arrangements of discrete electrical components on a circuit board, a Programmable Logic Controller (PLC), an Application-Specific Integrated Circuit (ASIC) or some other programmable circuit, for example also a Field Programmable Gate Array (FPGA), a Programmable Logic Arrangement (PLA) and/or a commercially available computer.

The invention also relates to a computer program with program code means for carrying out an above-described method when the program is executed on an open-loop and/or closed-loop control device, in particular on a microprocessor.

Some of the components of the apparatus according to the invention may basically correspond in terms of their construction to the apparatus according to EP 1 716 260 B1, for which reason the content of disclosure of EP 1 716 260 B1 is, in its entirety, integrated into the present disclosure by reference.

BRIEF DESCRIPTION OF THE FIGURES

Exemplary embodiments of the invention will be described in more detail below on the basis of the drawing.

The figures each show preferred exemplary embodiments, in which individual features of the present invention are illustrated in combination with one another. Features of an exemplary embodiment are also implementable separately from the other features of the same exemplary embodiment, and may accordingly be readily combined by a person skilled in the art with features of other exemplary embodiments in order to form further meaningful combinations and sub-combinations.

In the figures, functionally identical elements are denoted by the same reference designations.

In the figures, in each case schematically:

FIG. 1 shows an overall view of an apparatus according to the invention for carrying out the method in a first embodiment;

FIG. 2 shows a flow diagram of the method according to the invention;

FIG. 3 shows a perspective view of a part of the apparatus according to the invention for carrying out the method in a second embodiment;

FIG. 4 shows an impact device with two impact tools in an enlarged illustration as per the detail "A" from FIG. 1;

FIG. 5 shows an impact device with only one impact tool; and

FIG. 6 shows an impact-hardened transition radius in the case of which impact impressions of an impact head overlap along the annularly encircling transition radius.

DETAILED DESCRIPTION OF THE INVENTION

Figure 1:
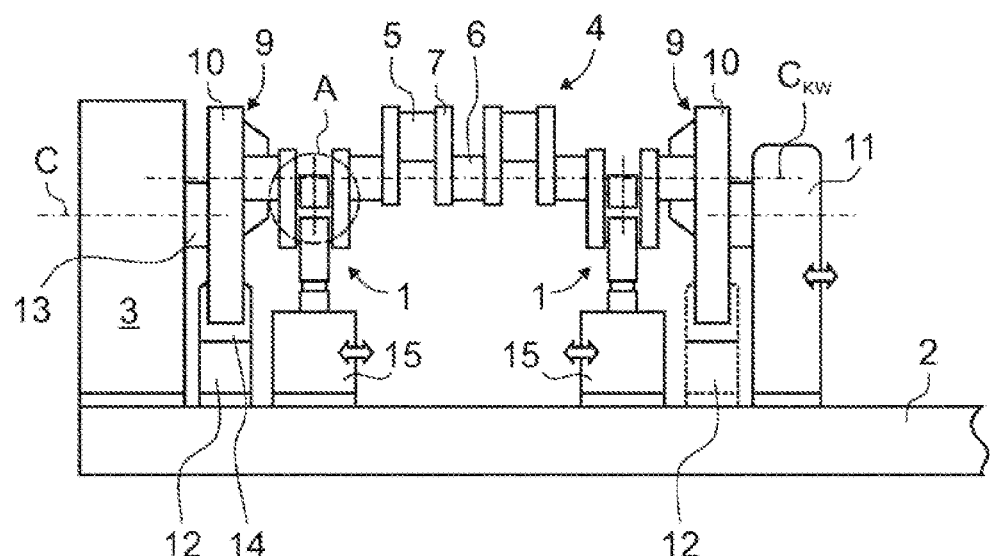

The apparatus illustrated in an overall view in FIG. 1 basically corresponds in terms of its construction to the apparatuses as per DE 34 38 742 C2 and EP 1 716 260 B1 with one or more impact devices 1, for which reason only the important parts, and the differences in relation to the prior art, will be discussed in more detail below.

The apparatus has a machine bed 2 and a drive device 3. The drive device 3 is used to move or rotate a crankshaft 4 along a direction of rotation into an impact position.

The crankshaft 4 has connecting-rod bearing journals 5 and main bearing journals 6, between which crank webs 7 are arranged in each case. Transition radii 8 (see FIGS. 4 to 6) are formed between connecting-rod bearing journals 5 and crank webs 7 and between main bearing journals 6 and crank webs 7, or generally between transitions in cross section of the crankshaft 4.

At that side of the crankshaft 4 which faces toward the drive device 3, there is provided a fastening device 9 which has a clamping disk or a fastening flange 10. On that side of the crankshaft 4 which is averted from the drive device 3, a support 11 preferably in the manner of a tailstock is provided, which has a further fastening device 9 for the purposes of rotatably receiving or rotatably fixing the crankshaft 4. Optionally or in addition to the support 11, a back rest may be provided which is positioned at a rotationally symmetrical location.

According to the invention, an arresting device 12 is provided, which engages in the region of an outer circumference of the fastening device 9. Basically, the arresting device 12 may be arranged at any desired location within the apparatus in order to apply an arresting force to an output shaft of the drive device 3, or to an input shaft 13, which in the present case is identical to said output shaft, of the fastening device 9, and thus to the crankshaft 4. The arresting device 12 may also engage on multiple locations of the apparatus. By way of example, a second part of the arresting device 12 in engagement with the fastening device 9 in the region of the support 11 is illustrated by dashed lines.

The arresting device 12 is based for example on a non-positive arresting action using a merely schematically illustrated brake shoe arrangement 14.

Figure 3:
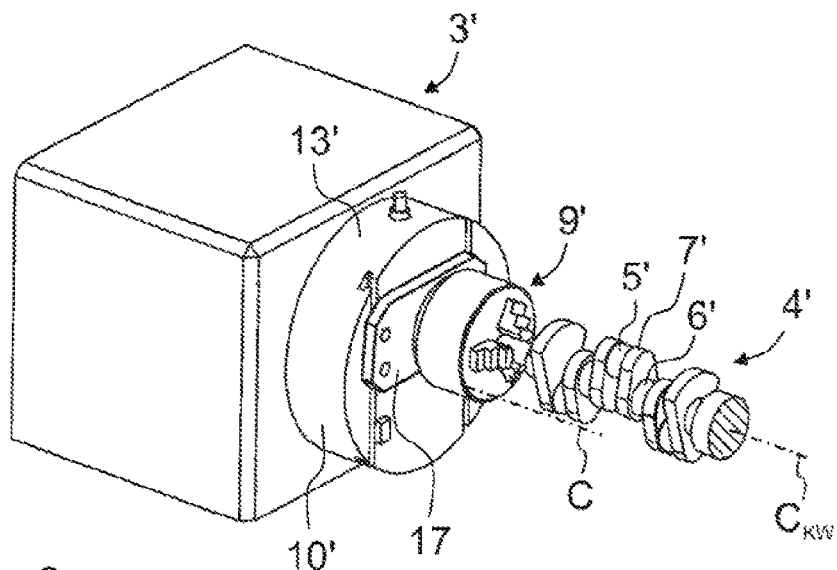

The drive device 3 is capable of setting the crankshaft 4 in rotation motion along an axis of rotation C. Provision may be made here whereby the main axis of rotation $C_{KW}$ of the crankshaft 4 is positioned eccentrically from the axis of rotation C of the drive device 3, as illustrated in FIG. 1 and FIG. 3. For this purpose, it is preferably possible for alignment means 17 (see FIG. 3) to be provided in the region of the fastening device 9. Here, provision may be made whereby the alignment means 17 displace a central axis of the journal 5, 5', 6, 6' that is respectively to be hardened such that the central axis of the journal 5, 5', 6, 6' lies on the axis of rotation C.

A direct drive, preferably without a clutch, is in particular provided for the drive device 3. A motor, preferably an electric motor, of the drive device 3 can thus be coupled without a transmission ratio or transmission to the fastening device 9 or to the crankshaft 4.

The impact devices 1 described in more detail by way of example below are each held adjustably in a displacement and adjustment device 15 in order to adapt them to the position of the connecting-rod bearing journals 5 and of the main bearing journals 6 and to the length of the crankshaft 4.

The support 11 may also be designed to be displaceable, as indicated by the double arrows in FIG. 1.

Two impact devices 1 are illustrated in FIG. 1, though basically any number of impact devices 1 may be provided, for example also only a single impact device 1.

Figure 2:
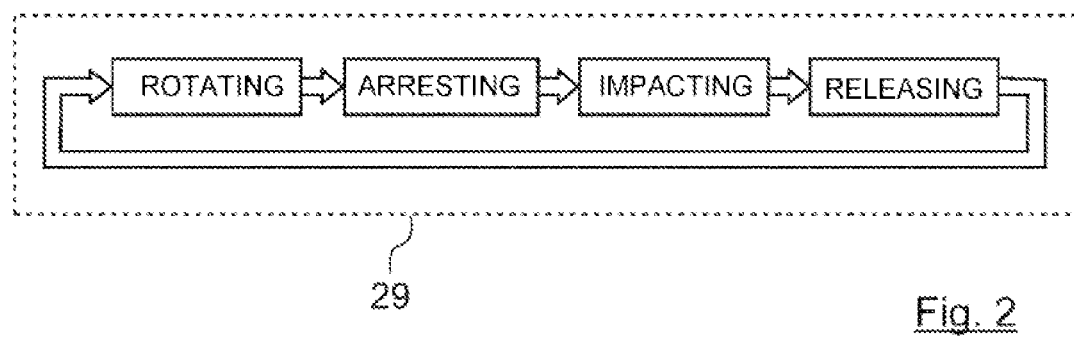

FIG. 2 illustrates a method which is basically composed of four steps (rotating, arresting, impacting, releasing).

For the operation of the drive device 3, which preferably comprises an electric motor, closed-loop position control may be used in order to rotate the crankshaft 4 into the respective impact position, wherein the crankshaft 4 is rotated preferably in stepped or clocked fashion.

After the crankshaft 4 has been rotated by the drive device 3 into the impact position, the crankshaft 4 is initially arrested in the impact position by the arresting device 12.

Subsequently, an impact force is introduced into at least one transition radius 8 of the crankshaft 4 by means of at least one impact tool 16 (cf. FIG. 4 and FIG. 5).

Preferably, the controller of the drive device 3 and the controller of the arresting device 12 are synchronized with one another such that the arresting device 12 arrests the crankshaft 4 only when the crankshaft 4 is at a standstill in the impact position.

Furthermore, it is also possible for the controllers of the arresting device 12 and of the at least one impact tool 16 (or of the at least one impact device 1) to be synchronized such that the at least one impact tool 16 introduces the impact force into the transition radius 8 of the crankshaft 4 only when the crankshaft 4 has been arrested in the impact position. The arresting of the crankshaft 4 is subsequently released again.

The method may subsequently be repeated as often as desired along a transition radius 8, preferably for one complete rotation along the circumference of the transition radius 8 or along the annularly encircling transition radius 8. It is also possible for more than one rotation to be provided, for example 2 or 3 rotations. However, there is no need for a complete rotation to be performed.

After a transition radius 8 has been impact-hardened in the desired manner, the impact tool 16, or the entire impact device 1, can be moved to the next transition radius 8 that is to be hardened, following which the method (rotating, arresting, impacting, releasing) can be repeated along the next transition radius 8 running in annularly encircling fashion around the journal.

The at least one impact tool 16 or the at least one impact device 1 may introduce the impact movement or the impact force with a periodicity, for example with a timing of 0.1 Hz to 50 Hz, preferably with a timing of 0.3 Hz to 10 Hz, particularly preferably with a timing of 0.5 Hz to 5 Hz and very particularly preferably with a timing of 0.5 Hz to 3 Hz.

An open-loop and/or closed-loop control device 29, preferably comprising a microprocessor, may be provided for carrying out the method. The open-loop and/or closed-loop control device 29 may for example also comprise or implement and/or synchronize the controllers of the drive device 3, of the arresting device 12 and/or of the at least one impact tool 16.

In particular, a computer program with program code means may be provided in order to carry out the method according to the invention when the program is executed on an open-loop and/or closed-loop control device 29, in particular on a microprocessor.

FIG. 3 illustrates, in a perspective view, a detail of a further apparatus for carrying out the method according to the invention but without an impact device. Here, the apparatus of FIG. 3 is substantially identical to the apparatus of FIG. 1, for which reason only the important differences will be referred to in detail below.

A drive device 3' is once again provided. In the embodiment of FIG. 3, the arresting de-vice is however arranged (in a manner which is not visible) within the drive device 3'. Although the arresting device is preferably arranged as illustrated in FIG. 1, the arresting device may thus also be accommodated within the drive device 3'. Here, however, provision is nevertheless made whereby the arresting device is activatable separately from the drive device 3'. The arresting device is, in FIG. 3, not a constituent part of the drive device 3'. The drive device 3' may possibly additionally have a dedicated brake device.

Furthermore, a fastening device 9' is provided which has a fastening flange 10' and, fastened thereto, a face plate with clamping jaws for fixing the crankshaft 4'. The face plate with the clamping jaws of the fastening device 9' is arranged on the fastening flange 10' adjustably on an alignment means 17, whereby the longitudinal axis $C_{KW}$ of the crankshaft 4' can be displaced relative to the axis of rotation C of the drive shaft 13'.

The crankshaft 4' of FIG. 3 has a configuration which deviates from the crankshaft 4 in FIG. 1, but basically likewise comprises connecting-rod bearing journals 5', main bearing journals 6' and crank webs 7'.

In FIG. 3 (as in FIG. 1), a further fastening device 9, 9' may be provided at that end of the crankshaft 4 which is averted from the drive device 3, though said further fastening device may also be omitted.

Figure 4:
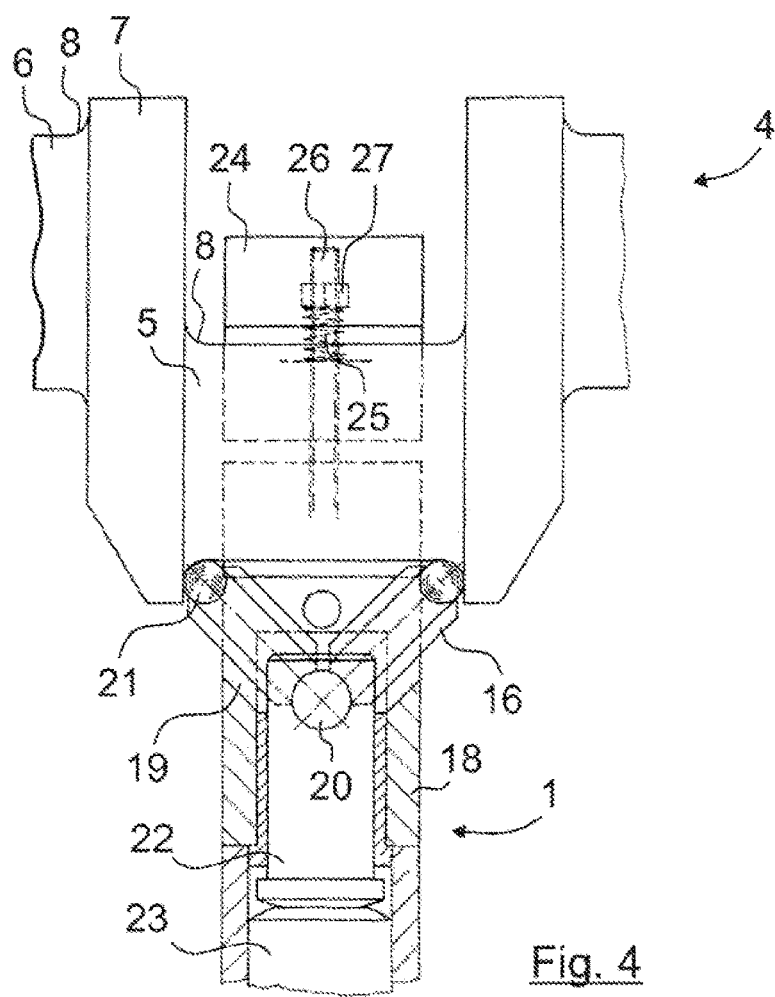

An impact device 1 of FIG. 1 is illustrated in more detail by way of example in FIG. 4. The invention may basically be implemented with any impact device 1. The impact device 1 described below is however particularly suitable. It has a main body 18 which may be provided with a prismatic abutment correspondingly to the radius of the crankshaft segment to be machined, and which preferably has guides 19 which guide two impact tools 16 in their support plane and provide them with a corresponding degree of freedom in terms of the support angle about a deflecting unit 20, which is advantageous for the adaptation to the dimensional conditions of the crankshaft 4. In each case one ball as impact head 21 is arranged at the front ends of the two impact tools 16. An intermediate part 22 produces the connection between an impact piston 23 and the deflecting unit 20, which transmits the impact energy to the impact tools 16. The intermediate part 22 may possibly also be omitted.

To increase the effectiveness of the impact, a clamping prism 24 may be fastened, via springs 25, by means of adjustable clamping bolts 26 with clamping nuts 27 to that side of the journal 5, 6 which is averted from the main body 18. Other structural solutions are also possible here.

By means of the arrangement of multiple impact devices 1 over the length of the crankshaft 4 to be machined, it is possible, as required, for all centrally and possibly eccentrically running regions of the crankshaft 4 to be machined simultaneously.

Figure 5:
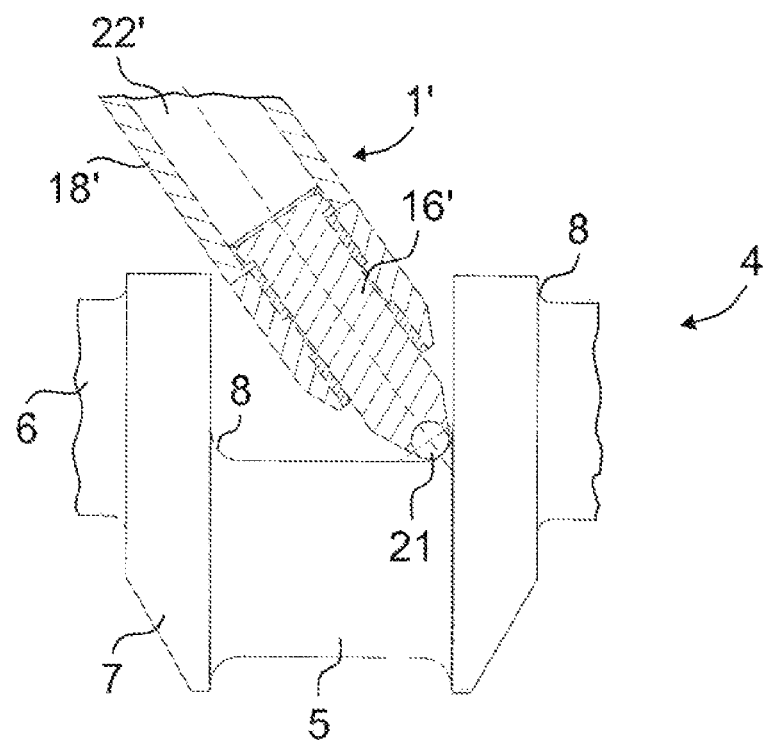

FIG. 5 shows an impact device 1' which is equipped with only one impact tool 16'. In the exemplary embodiment shown, the impact device 1' is preferably inclined relative to the crankshaft 4, specifically such that the impact tool 16', which is arranged coaxially with respect to the longitudinal axis of the impact device 1', impacts perpendicularly against the region of the crankshaft segment to be machined, in the present case of the transition radius 8 to be machined. In this case, although it is possible for in each case only one crankshaft segment to be machined, the structural design and the transmission of force by the impact device 1 are on the other hand better and simpler. Bore ends can additionally be hardened by means of this tool in a standing position.

This embodiment has proven particularly advantageous for use on non-symmetrical crankshaft segments, such as the end regions and the oil bore ends of the crankshaft 4.

Figure 6:
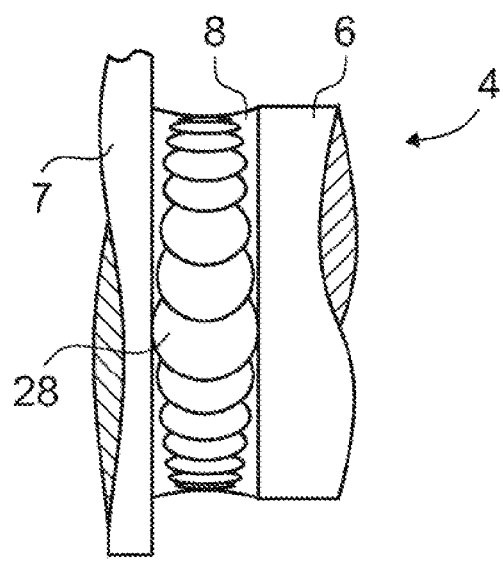

FIG. 6 illustrates an exemplary transition radius 8 between a main bearing journal 6 and a crank web 7, in the case of which the impact hardening has been performed such that the impact impressions 28 of an impact head 21 of the impact tool 16, 16' overlap along the transition radius 8 running in annularly encircling fashion around a main bearing journal 6.

To achieve this type of impact hardening, highly precise working or operation of the apparatus is necessary.

In particular if the impact spacings are set to be narrow, it is the case during a subsequent impact that the impact head 21 penetrates at least partially into the impact impression 28 of the preceding impact, whereby the impact force can exert a resetting rotational action on the crankshaft 4, 4'. The arresting device 12 may be designed to prevent such a rotational movement. It may in particular be advantageous for the arresting device 12 to be designed to prevent rotation of the crankshaft 4, 4' counter to the direction of rotation of the drive device 3, 3'.

Provision may also be made whereby at least one impact device 1 is designed and configured for the impact hardening of the transition radii 8 of the main bearing journals 6 and one impact device 1 is designed and configured for the impact hardening of the transition radii 8 of the connecting-rod bearing journals.

What is claimed is:

1. A method for the impact hardening of transition radii of a crankshaft, in particular of transition radii between connecting-rod bearing journals and crank webs and/or transition radii between main bearing journals and the crank webs of the crankshaft, wherein the crankshaft is firstly rotated by means of a drive device along a direction of rotation into an impact position, wherein an arresting device is provided in order to arrest the crankshaft in the impact position, following which an impact force is introduced into at least one transition radius by means of at least one impact tool, wherein the arresting device arrests the crankshaft indirectly by virtue of the arresting device arresting a fastening flange of a rotatable fastening device, to which the crankshaft is fixed.

2. The method as claimed in claim 1, wherein for the operation of the drive device, closed-loop position control is used in order to rotate the crankshaft into the impact position.

3. The method as claimed in claim 1, wherein the controller of the drive device and the controller of the arresting device are synchronized with one another such that the arresting device arrests the crankshaft only when the crankshaft is at a standstill in the impact position.

4. The method as claimed in claim 1, wherein the controller of the arresting device and the controller of the at least one impact tool are synchronized such that the at least one impact tool introduces the impact force into the at least one transition radius of the crankshaft only when the crankshaft has been arrested in the impact position.

5. The method as claimed in claim 1, wherein the drive device is designed as a direct drive.

6. The method as claimed in claim 1, wherein the arresting device and the drive device are arranged separately from one another.

7. The method as claimed in claim 1, wherein the arresting device engages on the fastening flange in the region of an outer circumference.

8. The method as claimed in claim 1, wherein the arresting device is designed to prevent rotation of the crankshaft counter to and/or in the direction of rotation of the crankshaft.

9. The method as claimed in claim 1, wherein the impact hardening is performed in such a way that the impact impressions of an impact head of the impact tool overlap in a defined manner along the respective transition radius running in annularly encircling fashion around the connecting-rod bearing journal and/or main bearing journal.

10. The method as claimed in claim 1, wherein the at least one impact tool performs an impact movement or introduces the impact force with a periodicity.

11. The method as claimed in claim 1, wherein the crankshaft is rotated preferably in stepped or clocked fashion.

12. The method as claimed in claim 1, wherein the drive device is designed without a clutch.

\* \* \* \* \*